Sept. 12, 1961  SHO TAKAHAMA  2,999,442
AUTOMATIC PHOTOGRAPHIC DIAPHRAGM

Filed Oct. 30, 1959  2 Sheets-Sheet 1

INVENTOR
SHO TAKAHAMA
BY Stanley Wolder
ATTORNEY

Sept. 12, 1961     SHO TAKAHAMA     2,999,442
AUTOMATIC PHOTOGRAPHIC DIAPHRAGM
Filed Oct. 30, 1959     2 Sheets-Sheet 2
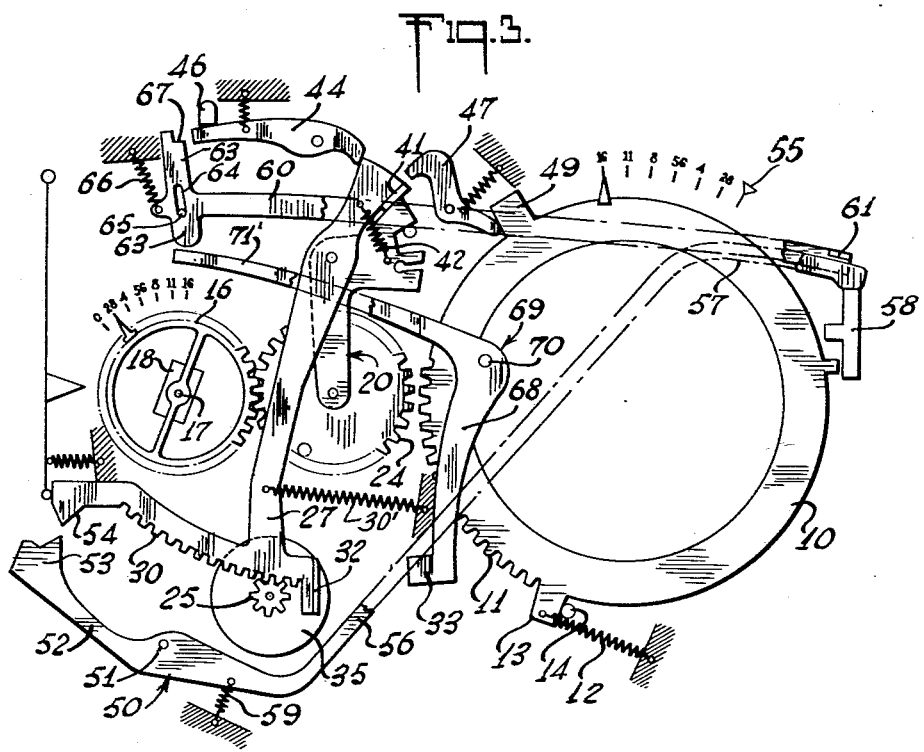
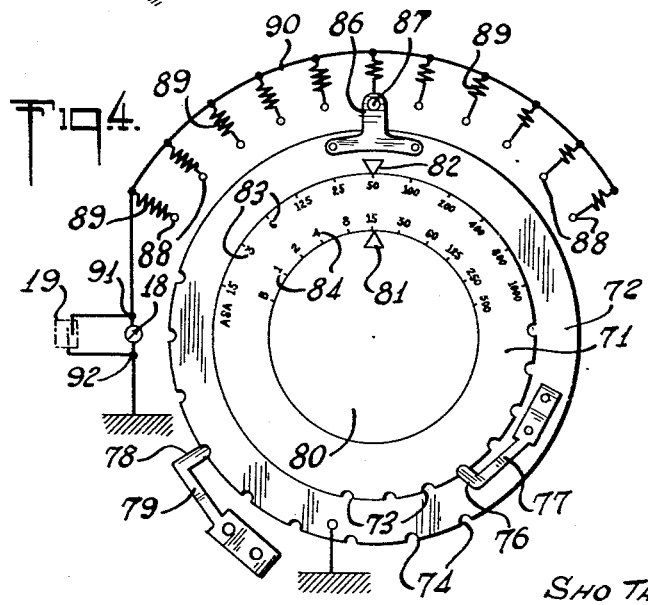
INVENTOR
SHO TAKAHAMA
BY Stanley Wolder
ATTORNEY

United States Patent Office 2,999,442
Patented Sept. 12, 1961

2,999,442
AUTOMATIC PHOTOGRAPHIC DIAPHRAGM
Sho Takahama, Nishinomiya-shi, Hyogo-ken, Japan, assignor to Yashica Co., Ltd., Tokyo, Japan, a corporation of Japan
Filed Oct. 30, 1959, Ser. No. 849,953
Claims priority, application Japan Jan. 14, 1959
8 Claims. (Cl. 95—10)

The present invention relates generally to improvements in cameras and it relates more particularly to an improved automatic light responsive camera diaphragm mechanism.

In photographing an object, it is necessary for optimum results to properly correlate the film speed, shutter speed, diaphragm aperture and the light reaching the camera. Since, under normal outdoor conditions, the film speed is fixed and the light is not controllable it is the camera diaphragm aperture which is subject to the most frequent adjustment. Since the diaphragm aperture must be correlated to the other parameters, its adjustment is time consuming and often inaccurate. There have been many types of automatic light responsive camera diaphragm mechanisms proposed and employed but these possessed many drawbacks and disadvantages and left much to be desired. They are usually not dependable and inaccurate and subject to frequent malfunctioning.

It is, therefore, a principal object of the present invention to provide an improved camera diaphragm actuating mechanism.

Another object of the present invention is to provide an improved automatic light responsive camera diaphragm mechanism.

Still another object of the present invention is to provide an improved automatic light responsive camera diaphragm mechanism wherein the diaphragm is not motivated by the light energized device.

A further object of the present invention is to provide an improved diaphragm mechanism of the above nature characterized by its ruggedness, accuracy and dependability.

The above and other objects of the present invention will become apparent from a reading of the following description taken in conjunction with the accompanying drawings wherein.

Figure 1:
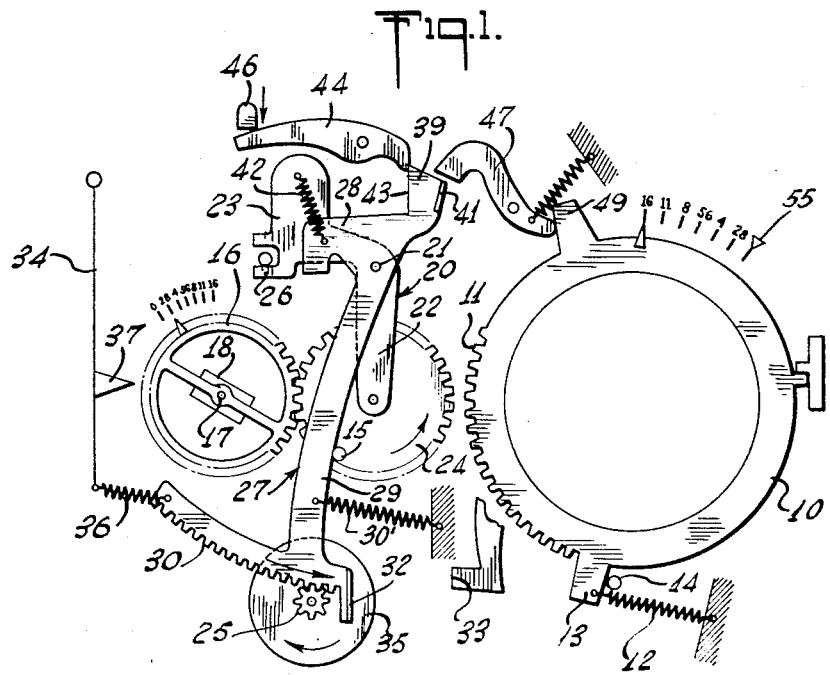
FIGURE 1 is a front elevational view, partially broken away and partially diagrammatic, of a diaphragm control mechanism embodying the present invention and illustrated in its ready position.

FIGURE 3 is a front elevational view, partially broken away and partially diagrammatic of another embodiment of the present invention illustrated in its ready position; and FIGURE 4 is a front elevational, partially schematic view of a sensitivity control device forming part of the present invention and employed to adjust the diaphragm control sensitivity in accordance with the shutter and film speeds.

In a sense, the present invention contemplates the provision of an improved automatic light responsive diaphragm mechanism comprising a light responsive movable control element, a movable diaphragm control member, a position adjustable transfer member movable into and out of engagement with said control element and adjustable by said control element when in engagement therewith and means for adjusting said diaphragm control member when said transfer member is out of engagement with said control element in accordance with the adjusted position of said transfer member.

Another feature of the present invention resides in the arrangement for adjusting the sensitivity of the light driven mechanism which includes a current meter having first and second terminals, a photoelectric cell connected across said current meter, a plurality of contact elements disposed in an arcuate path, a multi-tapped resistor network having a terminal connected to said meter first terminal and said taps connected to corresponding contact elements, a pair of first and second concentrically rotatable circular index members and a brush mounted on one of said index members and movable along the path of said contact elements and connected to said meter second terminal, said index members having indicators and indicia corresponding to film speed and shutter speeds associated therewith.

In accordance with one form of the present invention, the light responsive movable control element is a first gear connected to the armature of a current meter energized by a photo-electric cell. The diaphragm control member is a rack and the transfer member is a second gear rotatably carried on a swingable first arm into alternative engagement with the first gear and the rack. The second gear carries an eccentrically located transversely extending abutment pin and there is provided a second swingable arm coaxial with said first arm and adapted to engage said gear abutment pin. Springs urge the diaphragm control rack to a retracted position and the second arm to an advanced position whereby the second gear is urged into engagement with the rack by reason of the two arms being connected by another tension spring. First gear locking means actuated on advance of the second arm is provided. The second arm, in its advance position, actuates the camera shutter release mechanism. In operation, the first gear rotates the second gear to a position determined by the light intensity and upon release of the second arm it swings the second gear into engagement with the rack and then rotates the gear to drive the rack and upon engaging the abutment pin then actuates the shutter release. The rack then returns, returning the second gear to its original preset condition. The second arm may then be retracted to load its advancing spring, bring the second gear into its matching engagement with the first gear and release the first gear brake. Means may be provided to lock the second arm in its retracted position and to independently actuate the shutter release and adjust the diaphragm. The first gear actuating meter is provided with the sensitivity adjusting network described above.

Figure 2:
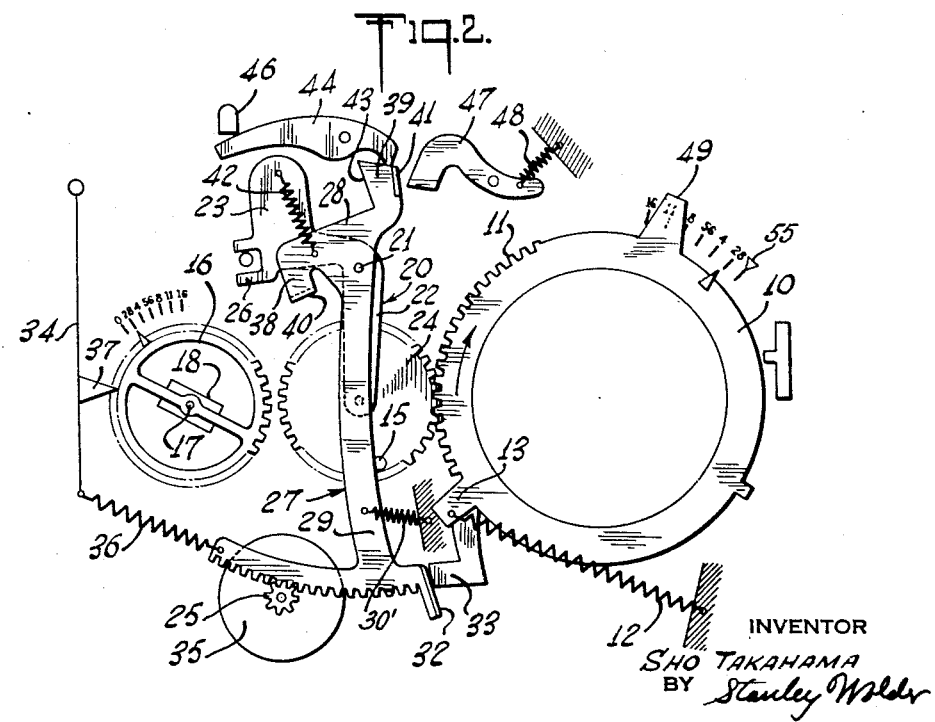
FIGURE 2 is a view similar to FIGURE 1 illustrating the mechanism during operation thereof.

Referring now to the drawings, and more particularly to FIGURES 1 and 2 thereof, which illustrate a preferred embodiment of the present invention, the reference numeral 10 generally designates a suitably rotatably mounted diaphragm aperture adjusting ring which is connected to and controls the camera diaphragm aperture in the well known manner, by rotation thereof, the ring 10 having teeth formed along its peripheral edge to define a rack 11. The ring 10 is normally urged to its retracted small aperture position by a helical tension spring 12 extending between a stationary support and an arm 13 projecting radially from the ring 10 and limited in its return motion by an abutment located in the path of the arm 13. The ring 10 and an adjacent surface may carry an indicator and indicia designating the aperture size.

A control element in the form of a first gear 16 lies in the plane of the ring 10 and is laterally spaced therefrom and affixed to the rotatable armature shaft 17 of a sensitive current meter 18 which is electrically connected in the usual manner to a desirably located photo-electric cell 19, as seen in FIGURE 4. The angular position of the gear 16 is thus determined by the light incident on the photo-electric cell 19, moving clockwise with an increase in light and vice versa, and visible indicia and an indicator may be provided to designate the gear angular position and hence the light intensity. The position transfer mechanism comprises a first swingable lever 20 mounted on an intermediate pin 21 and including a depending lower arm 22 and a laterally and upwardly extending arm 23. The transfer member is defined by a freely rotatable or idler gear 24 which serves as a transfer mounted at the lower end of the arm 22 and lying in the plane of and alternately movable into engagement with the control gear 16 and the rack 11. The idler gear 24 carries an abutment pin 15 which projects from an end face of the gear 24 adjacent its periphery. The swinging arc of the lever 20 and hence the lateral movement of the idler gear 24 is limited by a yoke 26 formed on the lever arm 23 and a stationary pin disposed between the arms of the yoke 26. A second lever 27 is swingably supported by the pin 21 and includes an upper laterally extending cross member 28 and a depending arm 29 terminating in a laterally extending sector shaped downwardly toothed rack 30. The rack 30 has the pin 21 as its center and is provided with a perpendicular abutment member 32 at its leading end. The lever 27 is urged to an advanced clockwise position by a helical tension spring connected between the arm 29 and a stationary support to the right thereof and traverses a path intersected by the gear abutment 15. A rotatable weighted fly wheel 35 is provided with a pinion gear 25 which engages the rack 30 along its full path.

A shutter release element cooperative in the conventional manner with the camera shutter mechanism is located at the end portion of the path of the abutment 32 and is triggered thereby as the arm lever 27 swings to an advanced position. Also motivated by the swinging of the lever 27 to an advanced position is the control gear braking device which includes an arm pivoted at its upper end and connected at its lower end by way of a helical tension spring 36 to the trailing end of the rack 30. A brake element 37 is located on the arm 34 and is normally out of engagement with the control gear 16 and is brought into braking engagement therewith upon the rack being swung to an advanced position.

The lever cross arm 28 includes a depending leg 38 and a second upwardly projecting oppositely laterally disposed leg 39, the leg 38 terminating in a forwardly directed horizontal flange or abutment 40 movable into engagement with the bottom edge of the lever arm 23, the leg 39 being provided along its outer edge with a forwardly directed vertical flange or abutment 41. The abutment 40 lies in the path of the lower edge of the lever arm 23 and limits the counterclockwise rotation of the lever 20 relative to the lever 27, and the upper portion of the lever arm 23 is connected by a helical tension spring 42 to the cross arm 28 whereby lever 20 is resiliently urged counterclockwise upon counterclockwise rotation of the lever 27. The trailing edge 43 of the leg 39 is movable along a path intercepted by a releasable intermediately pivoted catch member 44 which is spring urged to an advanced clockwise position wherein one end engages the leg edge 39 when the lever 27 is in its retracted position. A finger piece or button 46 engages the opposite end of the latch member 44 so that upon depression thereof the catch member disengages the leg 39 permiting the swinging of the lever 27 to an advanced position. A releasable stop member 47 is pivotly mounted and is resiliently swung by a suitably supported spring 48 to removably bring one end thereof into the path of the abutment member 41 to prevent the rotation of the lever 27 to its retracted position. The opposite end of the stop member 47 lies in the path of an arm 49 projecting radially from the diaphragm control ring 10 which arm holds the stop member 47 out of the path of the abutment element 41 when the ring 10 is in its counterclockwise retracted position.

Considering now the operation of the automatic diaphragm mechanism described above, the mechanism in its ready position is illustrated in FIGURE 1 of the drawing. In the aforesaid position the transfer gear 24 is rotated about its axis to an angular position in accordance with the light intensity by the light motivated control gear 16. The diaphragm control ring is retracted by the contracted spring 12, and the arm 49 lifts the member 47 out of the path of the abutment 41, the latch member 44, however, engaging the leg edge 43 to prevent the swinging of the lever 27 by the loaded spring 30'. Upon depresion of the button 46 the latching member 44 is rotated to release the lever 27 which is swung toward its advanced position by the spring 30'. As it is urged to its advanced position, the lever 27 carries the rack 30 forward to rotate the flywheel 35 which slows the movement of the lever 27 and assures the full even stroke thereof with a positive force at its terminus. The advancing lever 27 rotates the lever 20 by way of the coupling spring 42 to its advanced position to carry the transfer gear 24 out of engagement with the control gear 16 and into engagement with the ring carried rack 11. Simultaneous therewith the rack 30 brings the brake element 37 into engagement with the control gear 16 by way of the associated arm and spring 36. Following the engagement between the gear 24 and the rack 11 the lever 20 halts and the lever 27 continues its advance to bear upon the pin 15 and rotate the gear 24 an amount corresponding to the presetting thereof by the gear 16 and thereby rotate the ring 10 by way of the rack 11 a corresponding angle. At the end of the stroke of the lever 27 the shutter release element is tripped by the abutment 32. Thus the diaphragm ring 10 is automatically adjusted an amount determined by the light meter 18—19 to a correspondingly indicated diaphragm opening. It is of course obvious that in the absence of sufficient light for maximum lens opening, for example 2.8 as illustrated in the drawing, the diaphragm ring will rotate an additional amount bringing the indicator therein past the 2.8 indicia and to the indicia 55 in the absence of light. This obviously indicates insufficient light for taking a picture. Thereafter the ring 10 returns to its retracted position by the action of the spring 12 to rotate the gear 24 back to its preset position and to raise the stop member 47 from the path of the abutment 41. The stop member 47 prevents disengagement between the gear 24 and rack 11 before the return of the gear 24 to its preset position. The lever 27 is then manually moved by way of a finger piece (not shown) to its retracted position which swings the lever by way of the flange 40 to its retracted position carrying the gear 24 in its present position out of engagement with the rack 11 and back into matching engagement with the gear 16 and releases the brake 37 from the gear 16 permitting the rotation of the latter and the gear 24. In the retracted position of the lever 27 the spring 30' is loaded and the latch member 44 releasably locks the lever 27 in such position to permit the repitition of the above cycle.

In FIGURE 3 of the drawing there is illustrated another embodiment of the present invention which permits the manual setting of the diaphragm ring and is similar to the first described embodiment except as hereinafter set forth, the same reference numerals being applied to correspondingly functioning parts. The automatic features and functioning of the device are the same as above and need no further explanation. In addition to the elements previously identified there is provided a locking lever 50 rockable about a pivot 51 and including a first laterally upwardly extending arm 52 terminating in a stop member 53 movable, upon the swinging of lever 50, into engagement with an abutment member 54 carried at the free end of the rack 30 to releasably lock the rack 30 and the automatic diaphragm mechanism in a retracted inoperative position. It should be noted however that the gear 16 is freely rotatable by the light meter as is the gear 24 when the rack 30 is locked in a retracted position.

Extending in an opposite direction to arm 52 is a long upwardly laterally inclined arm 56 terminating in a horizontal leg 57 and movable between a latch and unlatch position by a finger piece 58 coupled thereto. A helical tension spring 59 connected between the arm 56 and a suitable support normally urges the lever 50 to a latch position. An elongated coupling arm 60 extends laterally and terminates at one end in a horizontal ledge 61 overlying the leg 57 and at its opposite end in a vertical cross piece 63 having an almost vertical inclined slot 64 formed therein which slidably engages a pin 65. A helical tension spring 66 connected between a lug on the cross piece 63 and a suitable support resiliently urges the cross piece to an upper position as limited by the pin 65. Upon rotation of the arm 60 about pin 65 the upwardly directed stepped end 67 of the cross piece 63 is brought into abutting engagement with the latching member 44. The trigger release member 33 is defined by the terminus of an arm 68 of a bell crank 69 pivoted at its knee by a pin 70 and having an arm 71 extending to a point directly below the bottom of the cross piece 63.

By raising the finger piece 58 the lever 50 is rotated to unlatch the rack 30 thereby permitting the automatic operation of the diaphragm mechanism as aforesaid. In the event that it is desired to manually adjust the diaphragm, the finger piece 58 is depressed, moving the lever 50 to latch position and locking the automatic control mechanism in an inoperative position. The ledge 61 is swung downwardly by spring 66 to follow the leg 57 whereby the cross piece stepped end 67 moves into engagement with the member 44. The diaphragm control ring may be manually adjusted as desired, conventional selectively operable means being provided (not shown) to releasably lock the ring 10 in a selected position. The shutter release member 33 may then be tripped by depressing the button 46 which urges the bell crank 69 counterclockwise by way of the member 44, cross piece 63 which slides along the pin 65, and crank arm 71'. The automatic diaphragm mechanism may be returned to operative position merely by raising the finger piece 58.

Referring now to FIGURE 4 of the drawing wherein there is illustrated an arrangement for adjusting the sensitivity of the gear driving light meter 18, there are provided a pair of superimposed concentric inner and outer discs 71 and 72 respectively, rotatably mounted on an accessible portion of the camera. The inner disc 71 has a plurality of regularly spaced recesses 73 formed in the peripheral edge thereof and the outer disc 72 has a plurality of regularly spaced recesses 74 formed in its peripheral edge, the angular spacing of the recesses 73 being the same as the angular spacing of the recesses 74. A detent element 76 carried on a spring arm 77 mounted on the outer disc 72 releasably engages selected recesses 73 and a detent element 78 carried on a spring arm 79 affixed to the camera body member releasably engages selected recesses 74. Thus the disc 72 may be releasably locked in a selected position and the disc 71 may be releasably locked in a selected position relative to the disc 71. A stationary disc 80 is mounted concentric with the discs 71 and 72 and is of smaller diameter than the inner disc 71 and carries an indicator 81 extending to the periphery of the disc 80. An indicator 82 is impressed on the outer disc 72 and is directed to the periphery of the inner disc 71. Indicia 83, corresponding to ASA film speeds and logarithmically graduated are located along the periphery of the inner disc 71 and are angularly spaced equal to the spacing of the recesses 73 and 74. Similarly, indicia 84 corresponding to shutter speeds and logarithmically graduated are located on the inner disc 71 along the periphery of the stationary disc 80 and are also angularly spaced equal to the spacing of the recesses 73 and 74.

Mounted on the peripheral border of the outer disc 72 is an outwardly radially directed arm 86 carrying a wiper member or brush 87. Extending along the arcuate path of the brush 87 and cooperating therewith are a plurality of contact elements 88 which are regularly angularly spaced by amounts equal to the angular spacing of the recesses 73 and 74. A plurality of resistors 89 of successively varying resistance values are connected between a line 90 connected to a terminal 91 of the meter 18 and the respective contact elements 88. The brush 87, in turn, is connected by way of the disc 72 and ground to the other terminal 92 of the meter 18.

In employing the sensitivity adjusting mechanism described above the discs 71 and 72 are rotated to bring the selected shutter and film speed indicia 84 and 83 into registry with the corresponding indicators 81 and 82 which will move the brush into engagement with a corresponding contact element 88. This will shunt the meter 18 with a respective resistor 89, adjusting the sensitivity of the meter in accordance with the resistance of the resistor and hence the properly combined values of the shutter and film speeds. The values of the resistors, which depend on the meter's absolute sensitivity may be readily determined by one skilled in the art.

While there has been described and illustrated preferred embodiments of the present invention it is apparent that numerous alterations, omissions and additions may be made without departing from the spirit thereof.

What is claimed is:

1. An improved automatic light responsive diaphragm mechanism, comprising a light meter rotated first gear, a rack carrying movable diaphragm control member, an idler gear, means alternatively supporting said idler gear in engagement with said first gear and said rack, said idler gear being rotated to a predetermined position by said first gear in accordance with the light actuating said meter, and means rotating said idler gear when in engagement with said rack in accordance with said predetermined position thereof to move said diaphragm control member an amount corresponding to the position of said first gear.

2. An improved automatic light responsive diaphragm mechanism in accordance with claim 1, including a shutter release member and means actuating said shutter release member following the movement of said diaphragm control member by said idler gear.

3. An improved automatic light responsive diaphragm mechanism in accordance with claim 1, including means for locking said first gear against rotation upon disengagement thereof by said idler gear.

4. An improved automatic light responsive diaphragm mechanism in accordance with claim 1, including means for returning said idler gear to its predetermined position following the movement of said diaphragm control member and prior to its disengagement from said rack.

5. An improved automatic light responsive diaphragm mechanism in accordance with claim 1, including a shutter release element and a first means actuating said shutter release element following the movement of said diaphragm control member by said idler gear.

6. An improved automatic light responsive diaphragm mechanism in accordance with claim 5, wherein said first shutter actuating means is motivated by said idler gear rotating means.

7. An improved automatic light responsive diaphragm mechanism in accordance with claim 5, including means for releasably locking said idler gear to said first gear and a second shutter release element actuating means operable independently of said first shuter release element actuating means.

8. An improved automatic light responsive diaphragm mechanism comprising a light meter including a photoelectric cell and a current meter connected across said photo-electric cell, a control element movable by said meter, a movable diaphragm control member, a position adjustable transfer member movable into and out of engagement with said control element and adjustable by said control element when in engagement therewith, means for adjusting said diaphragm control member when said transfer member is out of engagement with said control element in accordance with the adjusted position of said transfer member, a plurality of resistors of different values each having one terminus thereof connected to one terminal of said current meter, a plurality of contacts arranged along a predetermined path and connected to the corresponding other termini of said resistors, rotatably concentrically mounted inner and outer circular members having circumferentially spaced recesses formed in the peripheries thereof, said inner member having indicia impressed along the inner and outer edges of the peripheral border thereof corresponding to shutter speeds and film speeds, and said outer circular member carrying an indicator extending toward the periphery of said inner circular member, a first spring loaded detent mounted on said outer circular member and releasably engaging said recesses formed in said inner circular member, a second spring loaded detent releasably engaging said recesses formed in said outer circular member, and a brush mounted on said outer circular member and movable therewith along the path of said contacts, said brush being electrically connected to the other of said current meter terminals.

References Cited in the file of this patent

UNITED STATES PATENTS

| | | |
|---|---|---|
| 2,061,909 | Karg | Nov. 24, 1936 |
| 2,241,020 | Nerwin | May 6, 1941 |
| 2,278,338 | Tonnies | Mar. 31, 1942 |
| 2,838,985 | Burger | June 17, 1958 |
| 2,868,095 | Gebele | Jan. 13, 1959 |
| 2,923,216 | Greger | Feb. 2, 1960 |
| 2,925,760 | Broschke | Feb. 23, 1960 |